(12) United States Patent
Motoyama et al.

(10) Patent No.: US 7,307,754 B2
(45) Date of Patent: Dec. 11, 2007

(54) DENSITY CONTROL METHOD FOR IMAGE CONTROL APPARATUSES AND IMAGE FORMING APPARATUS CAPABLE OF EXECUTING THE METHOD

(75) Inventors: Eiichi Motoyama, Tokyo (JP); Mitsuhiko Sato, Chiba (JP); Yoshihito Osari, Tokyo (JP); Takashi Fujimori, Ibaraki (JP)

(73) Assignee: Canon Kabushiki Kaisha (JP)

( * ) Notice: Subject to any disclaimer, the term of this patent is extended or adjusted under 35 U.S.C. 154(b) by 1020 days.

(21) Appl. No.: 10/673,995

(22) Filed: Sep. 29, 2003

(65) Prior Publication Data

US 2004/0136017 A1    Jul. 15, 2004

(30) Foreign Application Priority Data

Sep. 30, 2002 (JP) .............................. 2002-287180

(51) Int. Cl.
  *G06F 15/00* (2006.01)
(52) U.S. Cl. .......................... 358/1.9; 358/2.1; 358/3.1; 358/406; 358/412; 358/518; 358/521; 358/523; 399/38; 399/46; 399/53; 399/167; 347/131; 347/184; 347/188; 347/196
(58) Field of Classification Search ................. 358/1.9, 358/2.1, 3.1, 406, 412, 518, 521, 523; 399/38, 399/46, 53, 167; 347/131, 184
See application file for complete search history.

(56) References Cited

U.S. PATENT DOCUMENTS 5,041,866 A * 8/1991 Imoto ........................... 355/38
5,752,126 A   5/1998 Muramatsu

FOREIGN PATENT DOCUMENTS

| JP | 7-20699 A | 1/1995 |
| JP | 9-292743 A | 11/1997 |
| JP | 2002-148878 A | 5/2002 |

* cited by examiner

Primary Examiner—Twyler Lamb
Assistant Examiner—Vu Hang
(74) Attorney, Agent, or Firm—Rossi, Kimms & McDowell LLP

(57) ABSTRACT

There is provided an image forming apparatus which is capable of quickly performing measurements required for obtaining a proper image density. The image forming apparatus having a plurality of image forming apparatuses performs an image density adjustment control process by carrying out a maximum density control process at a reference image forming speed, and carrying out a density gradation control process at each of the plurality of image forming speeds. Image forming conditions for carrying out the density gradation control process at speeds other than the reference image forming speed are determined by performing operation on image forming conditions determined by the maximum density control process carried out at the reference image forming speed.

8 Claims, 9 Drawing Sheets

DENSITY CONTROL METHOD FOR IMAGE CONTROL APPARATUSES AND IMAGE FORMING APPARATUS CAPABLE OF EXECUTING THE METHOD

BACKGROUND OF THE INVENTION

1. Field of the Invention

The present invention relates to a density control method for image forming apparatuses, and an image forming apparatus that is capable of executing the density control method.

2. Description of the Related Art

In conventional image forming apparatuses of an electrophotographic type such as copying machines, printers, and facsimiles, an electrostatic latent image is formed on a photosensitive member by exposure, is developed using toners, and is transferred onto a transfer sheet (recording sheet) and then visualized and fixed to form an image on the transfer sheet. Such electrophotographic image forming apparatuses, which form a color image using toners of four colors, i.e. yellow, magenta, cyan, and black, have become widely used.

There are two types of electrophotographic printers for forming a color image: a one-drum type in which toner images of respective colors are successively formed/transferred on one photosensitive member, and a four-drum type in which toner images formed by respective four exposure units, respective four developing devices, and respective four transfer devices are successively transferred onto a transfer sheet to form a color image thereon. In the four-drum type, an image can be transferred onto a transfer sheet on one path, and hence the throughput of color images can be increased as compared with the one-drum type.

For both the one-drum type and the four-drum type, there have been known a direct transfer method in which a toner image is directly transferred from a photosensitive member onto a transfer sheet, and an indirect transfer method in which a toner image is transferred from a photosensitive member onto an intermediate transfer member such as an intermediate transfer belt and is then transferred onto a transfer sheet. Generally, as compared with the direct transfer method, the indirect transfer method is less affected by surface shape, moisture content, etc. of a transfer sheet and hence enables more stable images to be obtained.

However, as photosensitive member surface characteristics, toner characteristics, transfer characteristics, and so forth vary according to environmental change and durability deterioration, resulting in variations in toner density, so that images are affected by such variations in toner density as well as by variations in quality of transfer sheets. For this reason, to obtain more stable images, it is necessary to reduce variations in toner density whether the one-drum type or the four-drum type is used. Particularly in the case where a color image is formed, variations in toner density between toners of respective colors are likely to cause a tinge in the formed image.

Conventionally, to correct for variations in toner density, there have been proposed, for example, a method in which a maximum density correction control process is carried out such that the density of a density patch with the maximum density is measured to detect latent image characteristics and development characteristics of the surface of a photosensitive member so that image forming conditions can be adjusted according to the characteristics, and a method in which a density gradation correction control process is carried out such that the densities of a plurality of density patches corresponding to a plurality of density gradations and formed for respective colors are measured to create a data conversion table for correcting data corresponding to each density information item according to detection results when creating actual image data (refer to the specification of U.S. Pat. No. 5,752,126).

According to the maximum density correction control process as described above, the image forming conditions of the image forming section are changed to correct variations in density reproduction range between respective colors. According to the density gradation correction control process, image data is corrected to correct for variations between density curves of density gradations of respective colors.

On the other hand, an increasing number of image forming apparatuses having a plurality of image forming speeds have been used so that color images can be formed on transfer sheets made of various materials mainly due to the necessity of decreasing the fixing speed in terms of the fixability, etc. of thick sheets, OHP sheets, and other types of sheets.

Specifically, if the one-drum type is used, in either the direct transfer method or the indirect transfer method, an image is formed at the same speed on all kinds of materials at stages up to a transfer section, and the sheet conveying speed is decreased at the stage of fixing. Therefore, it is unnecessary to have a plurality of image forming speeds.

If the four-drum type is used, however, in either the direct transfer method or the indirect transfer method, the conveying speed of a transfer sheet and the image forming speed must be equal to each other since transfer of toner images of respective colors is carried out on one path. If an image transfer section which transfers images onto a transfer sheet is sufficiently remote from a fixing section, the conveying speed of the transfer sheet and the image forming speed can be different, but in this case, the image forming apparatus has to be increased in size. For this reason, an increasing number of image forming apparatuses having a plurality of image forming speeds have been used.

In the above described image forming apparatus having a plurality of image forming speeds, in the case where densities of images formed at respective image forming speeds are required to be made uniform, the maximum density correction control process and the density gradation correction control process as described above must be carried out each time the image forming speed is changed, for the reason that as the image forming speed is changed, the amount of exposure per unit area during formation of an electrostatic latent image varies in terms of an integral component, and the amount of toner supplemented per unit area during development also varies.

However, if the maximum density correction control process and the density gradation correction control process are carried out at all image forming speeds, a period of time required for control raises a problem.

Specifically, in either the maximum density correction control process or the density gradation correction control process, an image forming sequence comprised of electrostatic charging, latent image formation, development, and intermediate transfer must be carried out to form a toner density patch and measure the density thereof. For example, if three image forming speeds are provided, correction control corresponding to the respective image forming speeds must be provided each time the image forming speed is changed, and thus, if the image forming speed is changed twice, a triple or more period of time for control is required

SUMMARY OF THE INVENTION

It is a first object of the present invention to provide a density control method for image forming apparatuses which solves the problems with the conventional image forming apparatuses, as well as an image forming apparatus that is capable of executing the method.

It is a second object of the present invention to provide a density control method for image forming apparatuses which make it possible to quickly carry out measurements required for obtaining a proper image density, as well as an image forming apparatus that is capable of executing the method.

To attain the first and second objects, in a first aspect of the present invention, there is provided a density control method for an image forming apparatus having a plurality of image forming speeds, comprising a first speed setting step of setting an image forming speed at which image formation is carried out by the image forming apparatus to a reference speed, a first control step of carrying out a maximum density control process at the reference speed in a manner such that image forming conditions are controlled such that a measured density of a first test image corresponding to a maximum density is equal to a predetermined value, a second control step of carrying out a density gradation control process at the reference speed to determine a conversion table for image signal conversion such that gradation characteristics of a second test image having a plurality of gradations are identical with predetermined characteristics, a second speed setting step of setting the image forming speed to a first speed other than the reference speed, and a third control step of carrying out the density gradation control process at the first speed.

According to the first aspect of the present invention, the problems with the conventional image forming apparatuses can be solved, and measurements required for obtaining a proper image density can be quickly performed.

Preferably, the first control step is executed in response to at least one of conditions being satisfied, the conditions including an instruction being given from an operator, a predetermined change being detected in environmental conditions, and image formation on a predetermined number of sheet materials being completed.

Preferably, the density control method for an image forming apparatus comprises an interrupting and restarting step of interrupting an image forming operation being executed, when there occurs a need to carry out the maximum density control process and the density gradation control process during the image forming operation, and restarting the interrupted image forming operation after completion of the density gradation control process carried out at the plurality of image forming speeds of the image forming apparatus.

Preferably, the reference speed as the image forming speed is a highest one of the plurality of image forming speeds of the image forming apparatus.

To attain the first and second objects, in a second aspect of the present invention, there is provided an image forming apparatus capable of carrying out an image forming process at a plurality of image forming speeds, comprising an image forming device, a detector that detects a density of an image for measurement formed by the image forming device, a first controller that carries out a maximum density control process in a manner such that the image forming device is controlled to form the image for measurement based on image data corresponding to a maximum density and such that the density of the formed image for measurement detected by the detector is equal to a predetermined value, and a second controller that carries out a density gradation control process to cause the image forming device to form the image for measurement having a plurality of graduations based on image data having a plurality of graduations, and determine a conversion table for image data conversion such that densities of respective gradations of the formed image for measurement detected as the density of the formed image for measurement by the detector exhibit predetermined characteristics, wherein the first controller carries out the maximum density control process at a reference image forming speed, and the second controller carries out the density gradation control process at each of the plurality of image forming speeds.

According to the second aspect of the present invention, the problems with the conventional image forming apparatuses can be solved, and measurements required for obtaining a proper image density can be quickly performed.

Preferably, the maximum density control process is carried out in response to at least one of conditions being satisfied, the conditions including an instruction being given from an operator, a predetermined change being detected in environmental conditions, and image formation on a predetermined number of sheet materials being completed.

Preferably, the image forming apparatus comprises an interrupting and restarting controller that interrupts an image forming operation being executed, when there occurs a need to carry out the maximum density control process and the density gradation control process during the image forming operation, and restarts the interrupted image forming operation after completion of the density gradation control process carried out at the plurality of image forming speeds of the image forming apparatus.

Preferably, the reference image forming speed is a highest one of the plurality of image forming speeds of the image forming apparatus.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. In the drawings, elements and parts which are identical throughout the views are designated by identical reference numerals, and duplicate description thereof is omitted.

Figure 1:
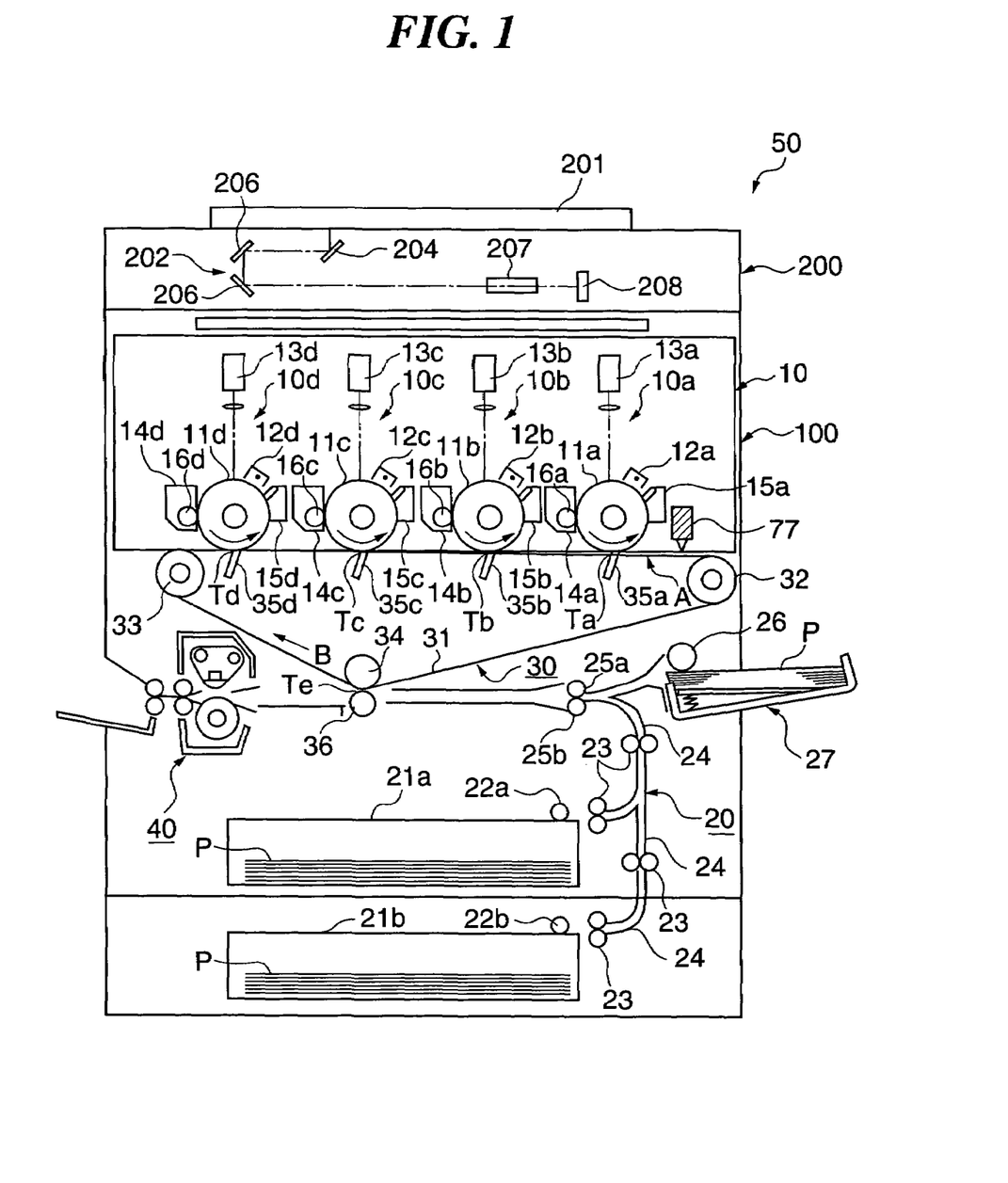
FIG. 1 is a sectional view showing the construction of an image forming apparatus that is capable of executing a density control method according to an embodiment of the present invention.

FIG. 1 is a sectional view showing the construction of an image forming apparatus 50 that is capable of executing a density control method according to an embodiment of the present invention. Reference numeral 200 denotes an image input section; 201, a platen glass on which an original is to be placed; and 202, a scanner having optical elements such as an original illumination lamp, not shown, scanning mirrors 204 to 206, a lens 207, and an image sensor 208.

When an image capturing process is started, the scanning mirror 204 of the image input section 200 is scanned back and forth in a predetermined direction horizontally as viewed in FIG. 1. Light reflected from an original is formed on a CCD sensor 109 (FIG. 3) in the image sensor 208 via the scanning mirrors 204 to 206 and the lens 207. It should be noted that an ADF (automatic document feeder) or a platen cover, not shown, is actually disposed on the image input section 200.

Reference numeral 100 denotes an image output section, which mainly includes an image forming section 10 (four stations 10a, 10b, 10c, and 10d which are juxtaposed and are identical in construction with each other), a sheet feed unit 20, an intermediate transfer unit 30, a fixing unit 40, and a control unit, not shown.

The image forming section 10 is constructed as described below. That is, each of photosensitive drums 11a, 11b, 11c, and 11d as image carriers is rotatably supported by a central shaft thereof, and is rotatively driven by a driving motor, not shown, in a direction indicated by an arrow in FIG. 1. At locations opposed to respective outer peripheral surfaces of the photosensitive drums 11a to 11d, primary chargers 12a, 12b, 12c, and 12d, optical systems 13a, 13b, 13c, and 13d, developing devices 14a, 14b, 14c, and 14d, and cleaning devices 15a, 15b, 15c, and 15d are arranged in a direction in which the photosensitive drums 11a to 11d are rotated.

The primary chargers 12a to 12d apply a uniform amount of electrostatic charge to the surfaces of the photosensitive drums 11a to 11d. Then, the optical systems 13a to 13d cause the respective photosensitive drums 11a to 11d to be exposed by a ray of light such as a laser beam, which has been modulated according to a recording image signal, so that electrostatic latent images are formed on the respective photosensitive drums 11a to 11d. Further, the developing devices 14a to 14d containing respective toners (developing agents) of four colors (yellow, cyan, magenta, and black) visualize the electrostatic latent images. The visualized images are transferred at the intermediate transfer unit 30. At locations downstream of primary transfer regions Ta, Tb, Tc, and Td, the cleaning devices 15a to 15d clean the respective photosensitive drums 11a to 11d by scraping toners thereon, which are remained without being transferred at the intermediate transfer unit 30. By the above described processing, images are successively formed using respective toners of four colors.

The sheet feed unit 20 includes cassettes 21a and 21b and a manual feed tray 27 for storing recording materials P (transfer sheets P); pick-up rollers 22a, 22b, and 26 for feeding the recording materials P one by one from any of the cassette 21a and 21b and the manual feed tray 27; a pair of sheet feed rollers 23 and a sheet feed guide 24 for conveying the recording material P fed from any of the pick-up rollers 22a, 22b and 26; and registration rollers 25a and 25b for feeding the recording material P to a secondary transfer region Te in accordance with image information timing of the image forming section 10.

The intermediate transfer unit 30 includes an intermediate transfer belt 31 as an intermediate transfer member, a driving roller 32, a tension roller 33, a driven roller 34, and a secondary transfer roller 36. The intermediate transfer belt 31 is made of PET (polyethylene terephthalate) or PVDF (polyvinylidene fluoride), for example. The intermediate transfer belt 31 is wound around the driving roller 32, the tension roller 33, and the driven roller 34, and is rotatively driven by the driving roller 32 while being tensioned by the tension roller 33 as appropriate.

The driving roller 32 is rotatively driven by a pulse motor, not shown, and is formed of a metal roller with the surface thereof coated with rubber (urethane rubber or chloroprene rubber) with a thickness of several millimeters so as to prevent the driving roller 32 from slipping on the intermediate transfer belt 31. A primary transfer plane A is formed between the driving roller 32 and the tension roller 33. In the primary transfer regions Ta to Td where the photosensitive drums 11a to 11d are opposed to the intermediate transfer belt 31, primary transfer blades 35a to 35d are arranged on the reverse side of the intermediate transfer belt 31.

The secondary transfer roller 36 is opposed to the driven roller 34, and forms the secondary transfer region Te by a nip between the secondary transfer roller 36 and the intermediate transfer belt 31. The secondary transfer roller 36 is pressurized against the intermediate transfer belt 31 with an appropriate force. A cleaning device, not shown, for cleaning an image forming surface of the intermediate transfer belt 31 is disposed on the intermediate transfer belt 31 and downstream of the secondary transfer region Te. The cleaning device includes a cleaner blade, not shown, made of polyurethane rubber, and a waste toner box, not shown, for storing waste toner.

In FIG. 1, a toner image density sensor 77 is disposed upstream of the driving roller 32 and is opposed to the surface of the intermediate transfer belt 31. The toner image density sensor 77 measures the densities of toners images of respective colors transferred in the primary transfer regions Ta to Td.

The above-mentioned control unit includes a control substrate, not shown, for controlling the operation of mechanisms in the above described component parts, a motor drive substrate, not shown, and so forth. The fixing unit 40 heats and pressurizes the recording material P onto which toner images have been secondarily transferred in the secondary transfer region Te, so that the toner images are fixed on the recording material P.

Figure 2:
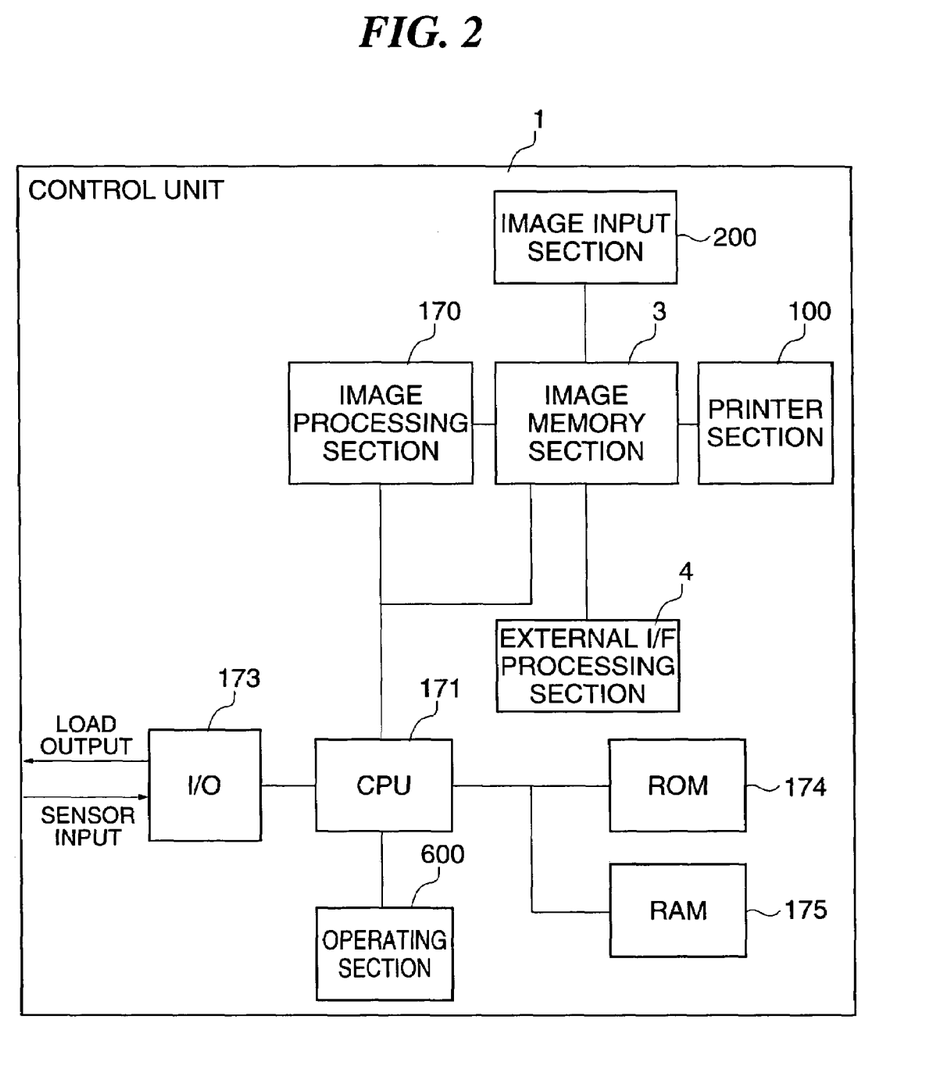
FIG. 2 is a block diagram schematically showing the configuration of a control unit of an image forming apparatus 50 appearing in FIG. 1.

FIG. 2 is a block diagram schematically showing the configuration of the control unit 1 of the image forming apparatus 50 in FIG. 1. Reference numeral 171 denotes a CPU, which controls the overall operation of the image forming apparatus 50, and to which are connected a ROM 174 storing control programs, a work RAM 175 for performing processing, an input/output (I/O) port 173, and so forth via an address bus and a data bus.

Connected to the input/output port 173 are a variety of loads, not shown, such as a motor for driving the image forming apparatus 50, a clutch, a sensor, not shown, for detecting the position of a sheet, and so forth. The CPU 171 sequentially provides input/output control via the input/output port 173 and carries out a sequence of image forming operations in accordance with the control programs stored in the ROM 174.

Further, an operating section 600 is connected to the CPU 171, which controls display and key entry of the operating section 600. That is, by operating keys on the operating section 600, the operator instructs the CPU 171 to change image formation modes, screen views, or the like. In accordance with the instructions, the CPU 171 sets operation modes, or controls display of the operating section 600.

An image processing section 170 for performing processing on an image having been converted into an electric signal by the CCD sensor 109, and an image memory section 3 for storing the processed image are connected to the CPU 171.

Figure 3:
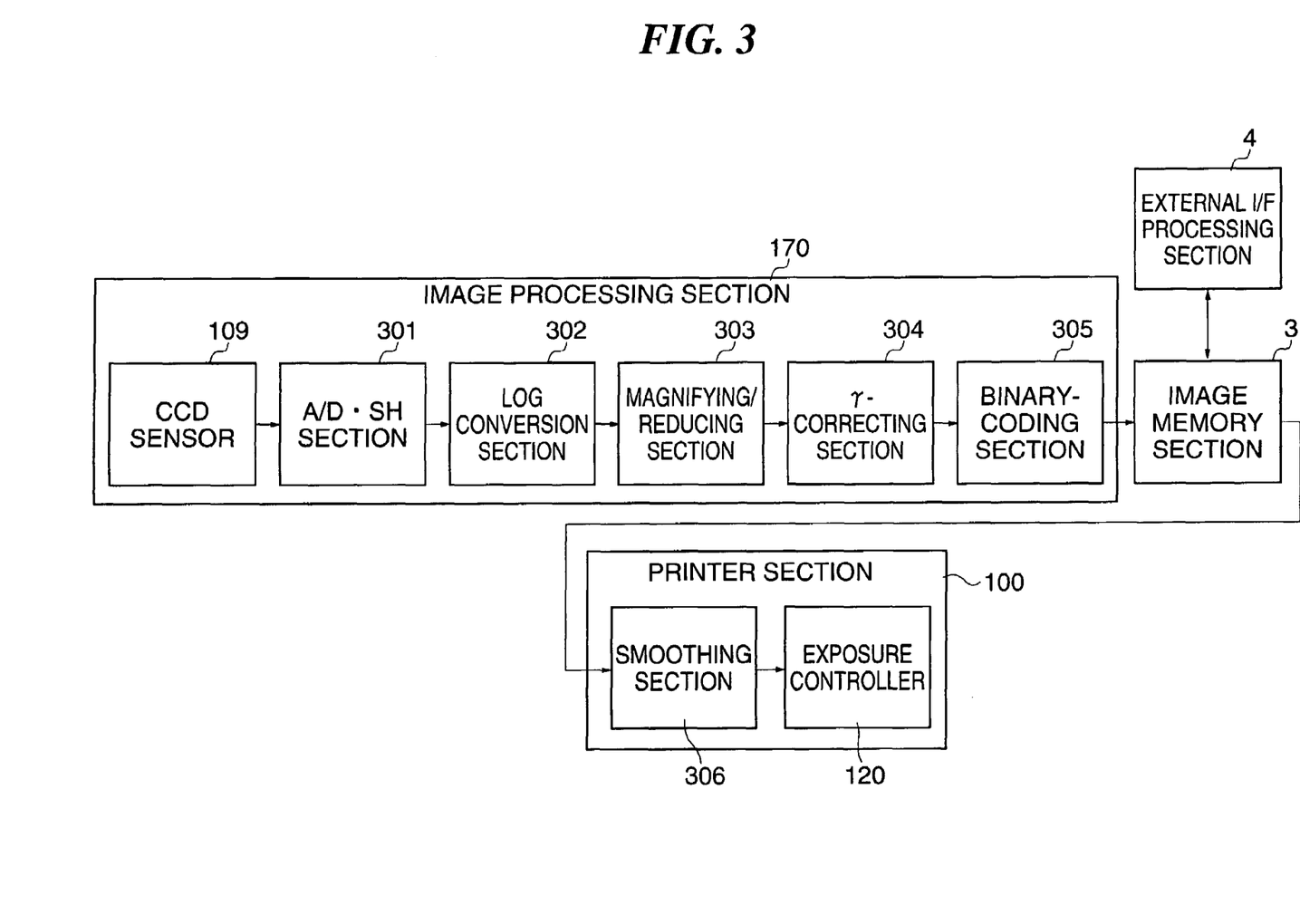
FIG. 3 is a block diagram schematically showing the configuration of an image forming section 170 appearing in FIG. 2.

Next, the operation of the image processing section 170 appearing in FIG. 2 will be described by referring to FIG. 3. In FIG. 3, light reflected from an image on an original and formed on the CCD sensor 109 via the lens 207 is converted into an analog electric signal and is inputted as luminance data to the image processing section 170. This analog luminance data is inputted to an analog signal processing section, not shown, where it is subjected to sample-and-hold processing and then to dark level correction and so forth. The luminance data is then converted into digital luminance data by an A/D SH section 301 (A/D conversion), and is subjected to shading-correction (to correct variations in performance of the CCD sensor 109 reading original images and luminous intensity distribution characteristics of the original illumination lamp). The resulting data is sent to a log conversion section 302.

The log conversion section 302 includes a LUT (Look Up Table) for converting the input luminance data into density data, so that the luminance data is converted into density data by outputting table values corresponding to the input data based on the LUT. The image is magnified/reduced to a desired magnification by a magnifying/reducing section 303, and the magnified/reduced image is inputted to a γ-correcting section 304.

When outputting the density data, the γ-correcting section 304 carries out conversion of the density data based on a LUT created according to characteristics of the printer section 100, and carries out output adjustment according to a density value set through the operating section 600 (γ-correction). The γ-corrected density data is sent to a binary-coding section 305.

The binary-coding section 305 binary-codes the multi-valued density data so that the density value can be represented by "0" or "255". Specifically, 8-bit image data is binary-coded to be converted into 1-bit image data represented by "0" or "1", so that the amount of image data to be stored in the image memory section 3 can be reduced. If the image data is binary-coded, however, the number of gradations of the image is decreased from 256 to 2, and hence image data such as a photographic image having a large number of medium tones is considerably deteriorated in image quality.

It is therefore necessary to provide artificial halftone expression using binary data. To artificially provide halftone expression using binary data, an error diffusing method is used here. In the error diffusing method, when density data of an image is greater than a certain threshold, the density data is converted into density data whose value is represented by "255", and when density data of an image is equal to or smaller than the threshold, the density data is converted into density data whose value is represented by "0", and the difference between the actual density data and the binary-coded data after conversion is distributed as an error to peripheral pixels. The error distribution is carried out by adding a value, which is obtained by multiplying the difference resulting from binary-coding by a weighted coefficient on a matrix prepared in advance, to the peripheral pixels. In this way, a mean density value of the entire image is stored, and half tones can be artificially expressed in binary notation.

The binary-coded image data is transmitted to and stored in the image memory section 3. It should be noted that image data transmitted from an external computer 9, described later, has already been processed as binary image data by an external I/F processing section 4, and hence is transmitted as it is to the image memory section 3.

Figure 4:
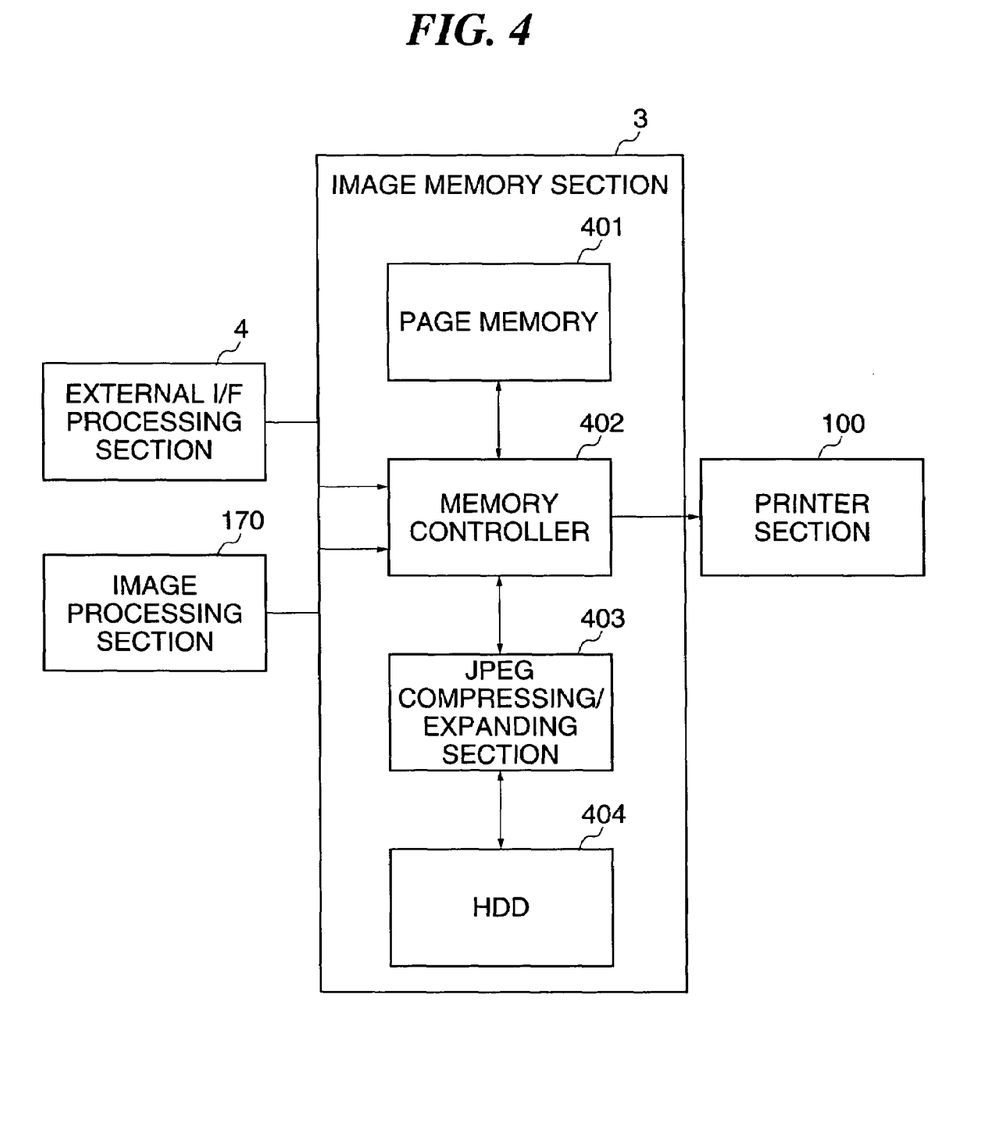
FIG. 4 is a block diagram schematically showing the configuration of an image memory section 3 appearing in FIG. 2.

The image memory section 3 includes a high-speed page memory 401, and a hard disk drive (HDD) 404 as a mass storage memory capable of storing image data of a plurality of pages (see FIG. 4). The image data of a plurality of pages stored in the hard disk drive 404 are outputted in an order suitable for an editing mode designated through the operation of the operating section 600 of the image forming apparatus 50. For example, if a sort mode is designated, image data of an original stored once is read out from the hard disk drive 404 and is repeatedly outputted a plurality of times so that the image data can be sorted as in a sorter having a plurality of bins.

Further, image data outputted from the image memory section 3 is transmitted to a smoothing section 306 of the printer section 100. The smoothing section 306 performs interpolation on the image data to smooth the leading end of the binary-coded image, and outputs the resulting data to an exposure controller 120. The exposure controller 120 provides control as described above to form an image of the image data on the transfer sheet P.

Referring next to FIG. 4, a description will be given of the detailed construction of the image memory section 3. In the image memory section 3, under the control of a memory controller 402, various kinds of processing are performed such as writing binary image data supplied from the external I/F processing section 4 and the image processing section 170 to the page memory 401, which is implemented by a DRAM or the like, transferring the same to the printer section 100, and writing and reading the same to and from the hard disk drive 404 via a JPEG compressing/expanding section 403.

The memory controller 402 causes generation of a DRAM refresh signal for the page memory 401, and controls access to the page memory 401 from the external I/F processing section 4, the image processing section 170, and the hard disk drive 404. The memory controller 402 also controls the address of writing in the page memory 401 and the address, direction, etc. of readout from the page memory 401 in accordance with instructions given from the CPU 171. As a result, the memory controller 402 realizes various functions such as a function of arranging or laying out a plurality of original images in the page memory 401 and outputting the laid out image data to the printer section 100, a function of cutting out and outputting a part of an image, and a function of rotating an image.

Figure 5:
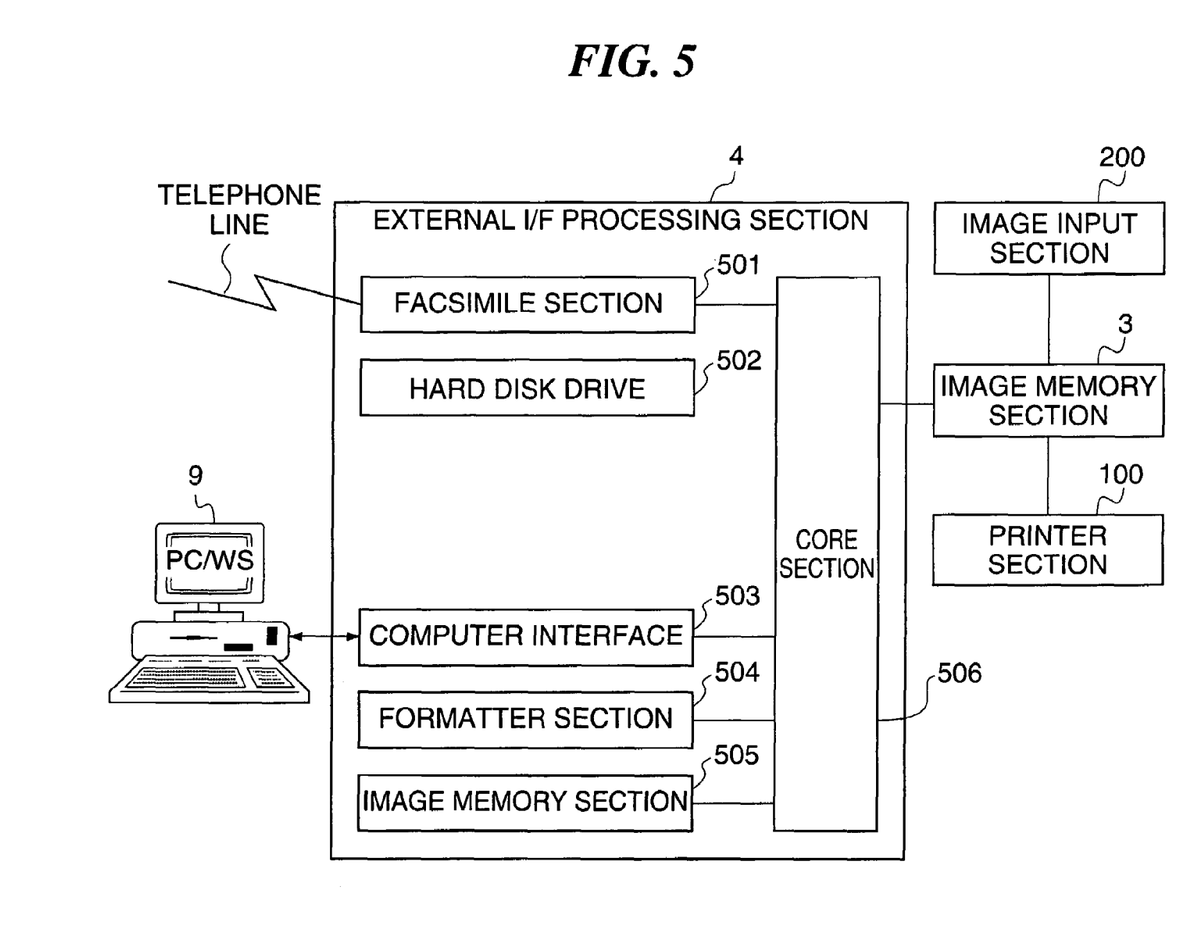
FIG. 5 is a block diagram schematically showing the configuration of an external I/F processing section 4 appearing in FIG. 4.

Referring next to FIG. 5, a description will be given of the construction of the external I/F processing section 4. The external I/F processing section 4 transmits image data, which is transmitted from the image input section 200 and stored in the image memory section 3, by facsimile or to the external computer (PC/WS) 9, and stores the image data received by facsimile or the image data transferred from the external computer 9 in the image memory section 3 so that it can be printed by the printer section 100.

The external I/F processing section 4 includes a core section 506, a facsimile section 501, a hard disk drive 502, a computer interface section 503, a formatter section 504, and an image memory section 505. The core section 506 controls the overall operation of the external I/F processing section 4.

Figure 6:
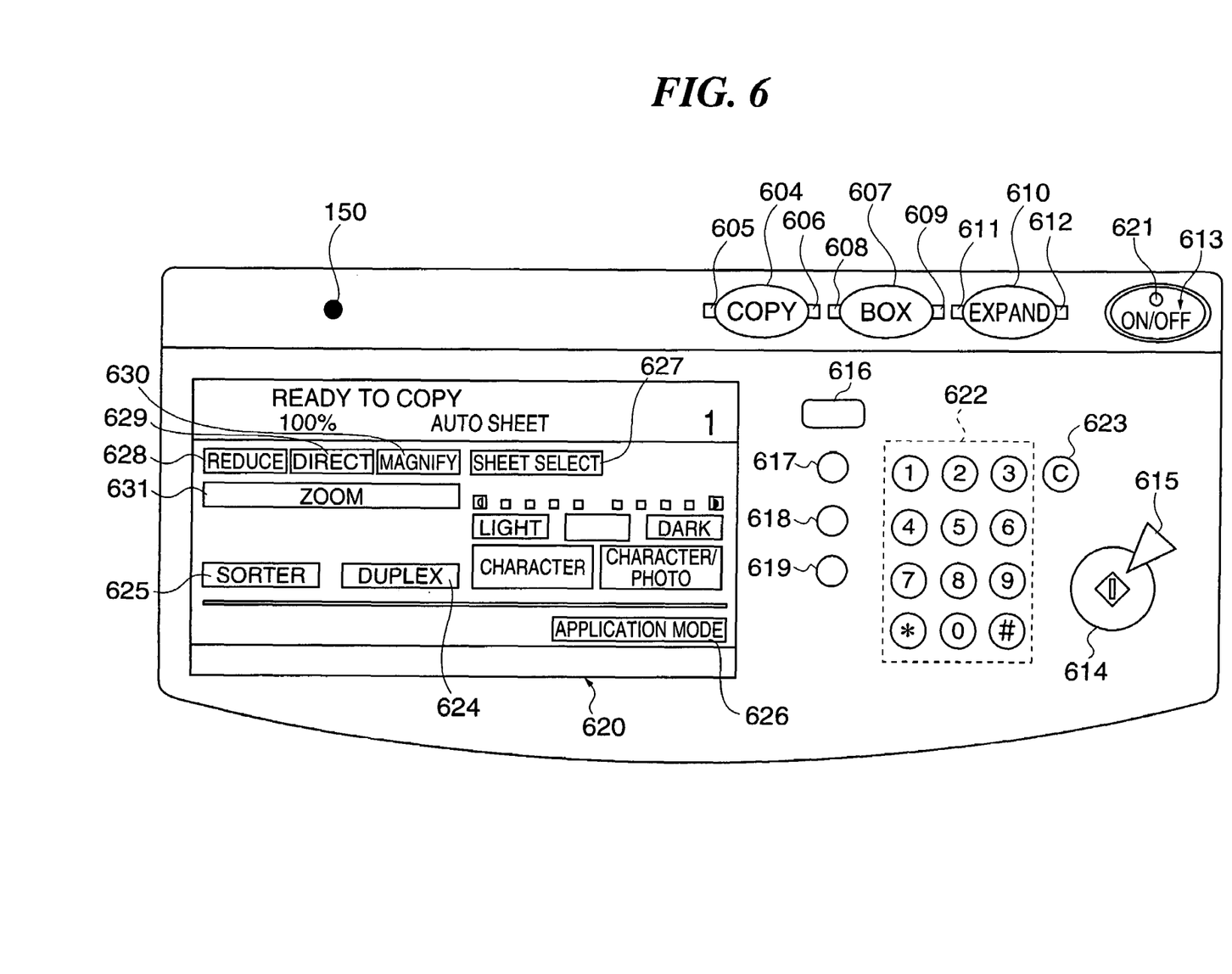
FIG. 6 is a top view showing the configuration of an operating section 600 appearing in FIG. 2.

Next, the details of the operating section 600 will be described by referring to FIG. 6. In FIG. 6, reference numeral 621 denotes a power lamp, which indicates whether or not power supply is on, and is turned on/off according to turning-on/off of a power switch 613. Reference numeral 622 is a ten key (registered trademark), which is used for inputting numeric values to set the number of sheets on which images are to be formed, and an operation mode. Reference numeral 623 denotes a clear key, which is used for clearing settings made through the operation of the ten key 622. Reference numeral 616 is a reset key, which is used for changing the set number of sheets on which images are to be formed, the set operation mode, or the selected sheet feed cassette back to the default.

Reference numeral 614 denotes a start key, which is depressed to start image formation. A red LED and a green LED for indicating whether image formation can be started or not are provided in the middle of the start key 614; the red LED is turned on when image formation cannot be started, and the green LED is turned on when image formation can be started. Reference numeral 615 denotes a stop key, which is used for stopping a copying operation. Reference numeral 617 denotes a guidance key.

Reference numeral 618 denotes a user setting key, which is depressed to change predetermined settings of the image forming apparatus 50. Reference numeral 619 denotes an interrupt key. Reference numeral 620 denotes a display panel, which is implemented by a liquid crystal panel, for example, and on which screen views are changed according to the set operation mode so as to facilitate detailed setting of operation modes. The surface of the display panel 620 is comprised of a touch sensor.

An example of setting screen views in a copy mode is displayed on the display panel 620 appearing in FIG. 6. In FIG. 6, keys 624 to 631 are displayed on the display panel 620. When the operator touches any of the keys 624 to 631, the corresponding mode is set.

Reference numeral 627 denotes a sheet cassette selecting key. Reference numerals 628 to 631 each denote a key for setting the magnification in copying. Reference numeral 626 denotes an application mode setting key, which is depressed to display a screen view for setting an application mode on the display panel 620. Reference numeral 624 denotes a double-sided copying setting key. Reference numeral 625 denotes a sort key.

In FIG. 6, reference numerals 604 to 612 denote keys and LEDs for changing screen views (operation screen view) to be displayed on the display panel 620 so as to set various functions of the copying operation using the image forming apparatus 50 and the system operation.

A description will now be given of an image density correction control process peculiar to the density control method according to the present embodiment. In the density control method according to the present embodiment, two control processes are carried out: a Vcont control process as a maximum density correction control process and a γ LUT control process as a density gradation correction control process.

Figure 7:
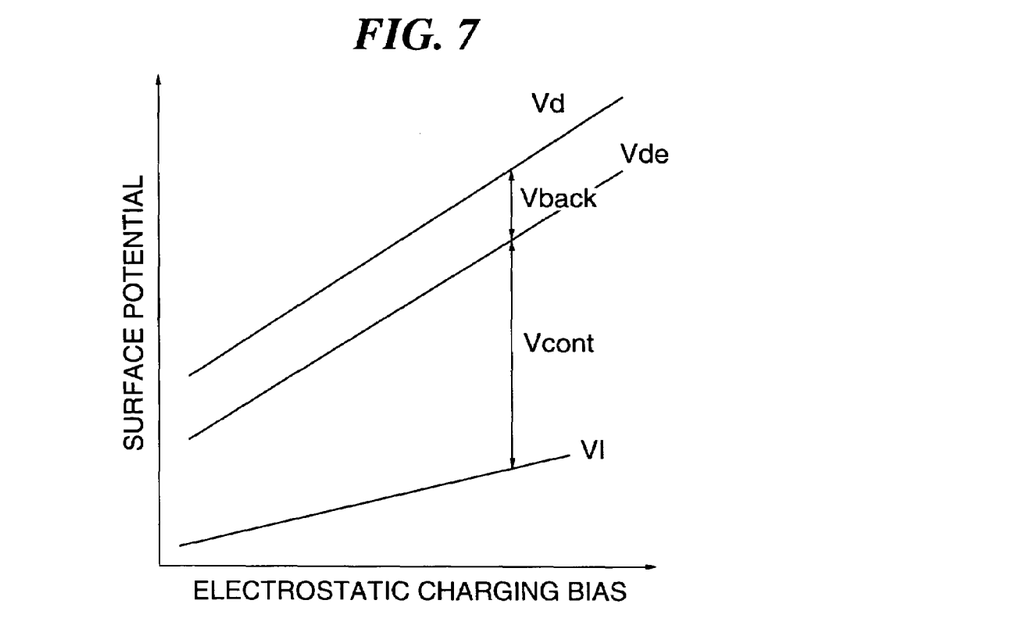
FIG. 7 is a graph showing the relationship between surface potential and electrostatic charging bias of photosensitive drums 11a to 11d appearing in FIG. 1.

FIG. 7 is a graph showing the relationship between surface potential and electrostatic charging bias of the photosensitive drums 11a to 11d appearing in FIG. 1, i.e. the relationship between the surface potential of the photosensitive drums 11a to 11d and the potential of the developing devices 14a to 14d when the image has the minimum density and when the image has the maximum density. In FIG. 7, the abscissa represents the electrostatic charging bias of the photosensitive drums 11a to 11d; the ordinate represents the surface potential of the photosensitive drums 11a to 11d.

Vback represents a specified value determined such that development bias characteristics Vdc of the photosensitive drums 11a to 11d have a predetermined relationship with a dark area surface potential Vd (Vd characteristics) of the photosensitive drums 11a to 11d when an image data output value corresponding to the minimum density is "00h (0)". The value Vback is expressed by the following equation:

$$Vback = Vd - Vdc$$

Vcont represents a value that is obtained from the development bias characteristics Vdc found from the specified value Vback and a lighted area surface potential Vl (Vl characteristics) of the photosensitive drums 11a to 11d in the case where an image data output value corresponding to the maximum density of an image is "FFh (255)". The value Vcont is expressed by the following equation:

$$Vcont = Vdc - Vl$$

It should be noted that output values postfixed with "h" are given in hexadecimal, and output values put in parenthesis "( )" are given in decimal.

Figure 8:
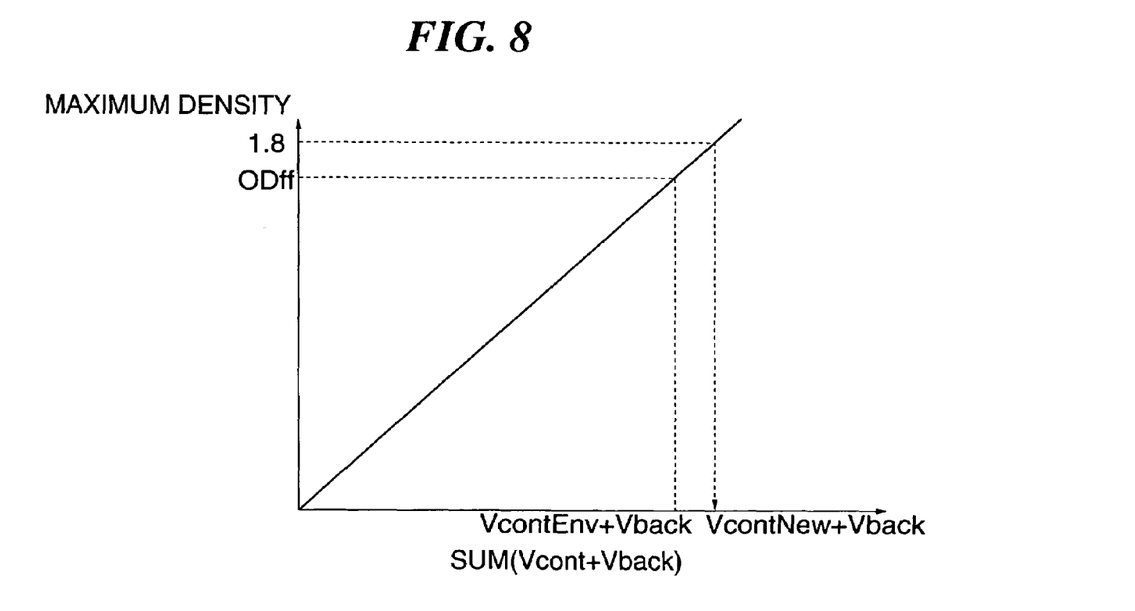
FIG. 8 is a graph useful in explaining the principle of a maximum density correction control process forming part of the density control method according to the embodiment.

A description will now be given of how the value Vcont is calculated by the Vcont control process with reference to FIG. 8. FIG. 8 is a graph useful in explaining the principles of the Vcont control process carried out by the density control method according to the present embodiment. In FIG. 8, the abscissa represents the sum of Vcont and Vback (Vcont+Vback) in FIG. 7; the ordinate represents the maximum density Dmax of an image to be formed.

As shown in FIG. 8, it is assumed that the maximum density Dmax and the sum (Vcont+Vback) are proportional to each other. Therefore, if the value Vcont in the present environment (the set operation mode) is represented by VcontEnv, the target set value of the maximum density is 1.8, and a density data output value "FFh" detected by the toner image density sensor 77, i.e. the actual density value of a maximum density patch is designated by ODff, a value VcontNew as the value Vcont in the new environment is calculated using the following equation based on FIG. 8:

$$VcontNew = (VcontEnv + Vback) \times 1.8 / ODff - Vback$$

The above described processing is performed for each color, and thereafter, image formation is carried out with a high voltage being outputted according to the value VcontNew used as the value Vcont. Specifically, based on VcontNew values calculated for the respective colors, outputs from a high-voltage transformer to the primary chargers 12a to 12d are controlled (the surface potential of the photosensitive drums 11a to 11d is controlled), and development biases to be applied to the developing devices 14a to 14d (development sleeves 16a to 16d) are controlled.

Figure 9:
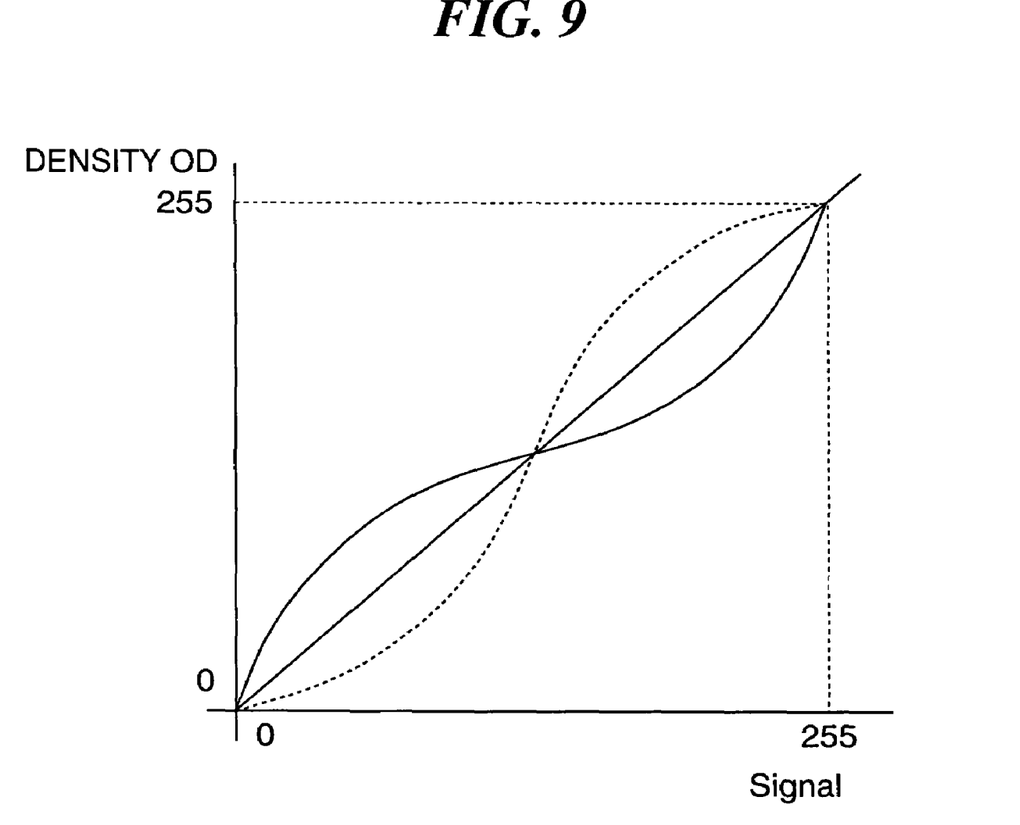
FIG. 9 is a graph useful in explaining the principles of a density gradation correction control process forming part of the density control method according to the embodiment.

FIG. 9 is a graph useful in explaining the principle of the γ LUT correcting process as the density gradation correction control process of the density control method according to the present embodiment.

In FIG. 9, the dotted curve indicates data on the density of a toner patch transferred onto the intermediate transfer belt 31, which is detected by the toner image density sensor 77. It is ideal that the relationship between density outputs and desired output values has the linearity as indicated by a straight line connecting the origin 0 to points (a density OD "255 (FFh)") and a signal value (Signal) of "255 (FFh)") in FIG. 8. For example, when a density of "80 h" is desired to be outputted, a signal value of "80 h" is outputted.

Actually, however, the printer characteristic density detected by the toner image density sensor 77 does not have such linearity as indicated by the dotted curve in FIG. 9. To overcome this problem and obtain a desired density for output data as a printer output image, a value whose γ LUT value is great in a low-density range needs to be outputted and a value whose γ LUT value is small needs to be outputted in a high-density range. The curve of γ LUT values is formed such that the curve of read densities are symmetrical to the above described ideal straight line (refer to the solid curve in FIG. 9). A description will now be given of a density adjustment control process forming part of the density control method according to the present embodiment with reference to a flow chart of FIG. 10.

Figure 10:
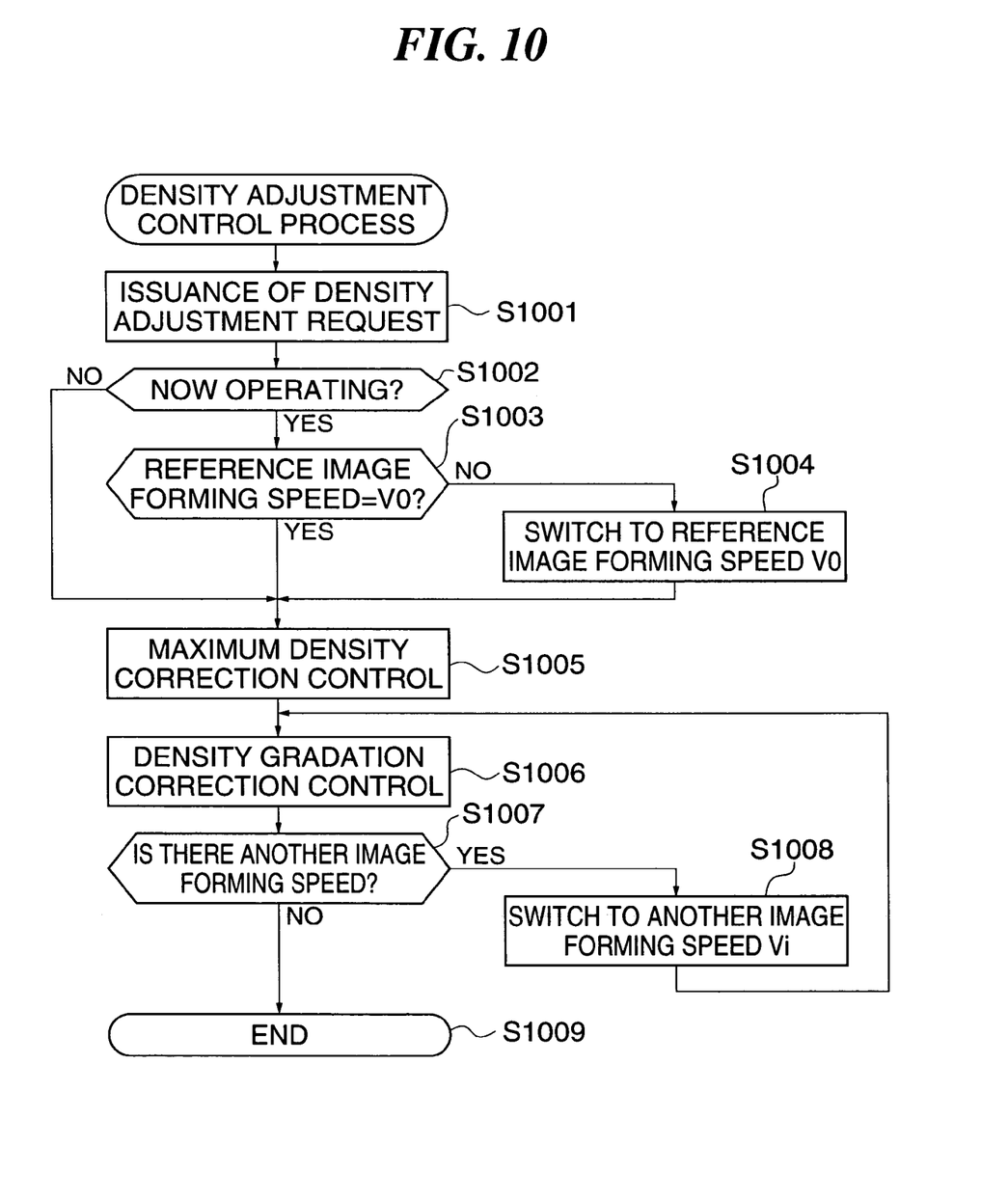
FIG. 10 is a flow chart showing a density adjustment control process of the density control method according to the embodiment.

In a step S1001, a density adjustment request to carry out the density adjustment control process including the maximum density correction control process and the density gradation correction control process is issued. This density adjustment request is issued in response to an instruction from the operator, in response to detection of a predetermined amount of change in environment (temperature and moisture), or when a predetermined number of sheets have been printed. When the density adjustment request is issued in the step S1001, it is determined in a step S1002 whether the image forming apparatus 50 is operating or not. If it is determined that the image forming apparatus 50 is operating, it is then determined whether the intermediate transfer belt 31 is rotating or not at a reference image forming speed V0 (step S1003). If it is determined in the step S1002 that the image forming apparatus 50 is not operating, the process proceeds to a step S1005, described later, and subsequent steps.

If it is determined in the step S1003 that the intermediate transfer belt 31 is not rotating at the reference image forming speed V0, the process proceeds to a step S1004 wherein the present image forming speed is switched to the reference image forming speed V0, and then proceeds to the step S1005 wherein the maximum density correction control process is carried out.

If it is determined in the step S1003 that the intermediate transfer belt 31 is rotating at the reference image forming speed V0, the maximum density correction control process is carried out in the step S1005 without changing the image forming speed. It should be noted that in the step S1005, the maximum density correction control process is carried out for each color at the reference image forming speed V0. The process then proceeds to a step S1006 wherein the density gradation correction control process is carried out. At this time point, the density adjustment control process carried out at the reference image forming speed V0 is completed.

After the density gradation correction control process is carried out in the step S1006, it is determined in a step S1007 whether there is another image forming speed at which the density gradation correction control process has not yet been carried out. If it is determined in the step S1007 that there is no other image forming speed at which the density gradation correction control process has not yet been carried out, it is determined that the density adjustment control process carried out at all the image forming speeds has been completed, and then the process is terminated in a step S1009.

If it is determined in the step S1007 that there is another image forming speed at which the density gradation correction control process has not yet been carried out, the process proceeds to a step S1008 wherein the present image forming speed is switched to another image forming speed Vi. After the present image forming speed is switched to the image forming speed Vi, the process returns to the step S1006 wherein the density gradation correction control process is carried out for each color at the new image forming speed Vi, and thereafter, the above described steps S1007 and S1008 are executed again. That is, the steps S1006, S1007, and S1008 are repeated a number of times corresponding to the number of image forming speeds at which the image forming apparatus 50 is capable of carrying out image formation. Therefore, assuming that the image forming apparatus 50 is capable of carrying out image formation at three image forming speeds and has image forming sections for four colors, twelve γ LUTs are formed.

It should be noted that when the density gradation correction control process is carried out at an image forming speed other than the reference image forming speed V0 in the step S1006, the required image forming conditions (the maximum density correction control value), i.e. the value VcontNew, outputs from the high-voltage transformer to the primary chargers 12a to 12d based on the value VconNew, and development biases to be applied to the developing devices 14a to 14d are found from correction values, which are calculated by taking into account the value VcontNew found in the step S1005 and a difference between the speeds V0 and Vi.

In this way, the maximum density correcting process (density range adjusting process) is carried out at the reference image forming speed, and image forming conditions for other image forming speeds are determined by performing operation on image forming conditions adjusted by the maximum density control process carried out at the reference image forming speed to thereby correct the same image informing conditions. The gradation correcting process is carried out at each image forming speed. This enables the density adjusting process to be promptly carried out at each image forming speed.

If the density adjustment request is issued during an image forming operation, the image forming operation is interrupted and at the same time the maximum density correction control process and the gradation correction control process are carried out. After the maximum density correction control process and the gradation correction control process are completed, the image forming speed is switched to an image forming speed at which the image forming operation was interrupted, so that the interrupted image forming operation is restarted.

It is preferred that the reference image forming speed V0 is the highest one of image forming speeds that can be selected by the image forming speed 50. This enables the density adjusting process to be carried out more quickly, due to the generally accepted characteristic that as the image forming speed is lower, the amount of exposure per unit and the amount of toner supplied increase to raise the density.

The above described embodiment is, of course, not limitative to the present invention, but the present invention may be applied to a one-drum type image forming apparatus insofar as it is an electrophotographic type. Further, image forming conditions to be corrected in the maximum density correcting process are not limited to the potential of the photosensitive drums and the potential of the developing devices, but at least one of the following conditions may be corrected: the potential of the photosensitive drums, the potential of the developing devices, and the signal intensity of exposure scan data (laser light modulated based on image data).

Further, a plurality of toner density detecting sensors may be provided for respective colors so that the toner density can be detected accurately to carry out the density adjusting process with high accuracy. Further, the density control method according to the present invention may also be applied to an image forming apparatus of the type that a toner image is directly transferred onto a recording sheet wound around a transfer drum without using an intermediate transfer member.

Further, it goes without saying that the object of the present invention may also be accomplished by supplying a system or an apparatus with a storage medium (or a recording medium) in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention. Moreover, it also goes without saying that the functions of the embodiments described above may be realized not necessarily by causing the computer to read and execute the program code, but alternatively by causing an operating (OS) system running on the computer to perform part or all of the actual processing based on instructions in the program code.

Further, it also goes without saying that the functions of the above described embodiment may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code. In case that the present invention is applied to the storage medium above described, the program code corresponding to the flow chart shown in FIG. 10 is stored in the storage medium.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A density control method for an image forming apparatus having a plurality of image forming speeds, comprising:
    a first speed setting step of setting an image forming speed at which image formation is carried out by the image forming apparatus to a reference speed;
    a first control step of carrying out a maximum density control process at the reference speed in a manner such that image forming conditions are controlled such that a measured density of a first test image corresponding to a maximum density is equal to a predetermined value;
    a second control step of carrying out a density gradation control process at the reference speed to determine a conversion table for image signal conversion such that gradation characteristics of a second test image having a plurality of gradations are identical with predetermined characteristics;
    a second speed setting step of setting the image forming speed to a first speed other than the reference speed; and
    a third control step of carrying out the density gradation control process at the first speed.

2. A density control method for an image forming apparatus according to claim 1, wherein said first control step is executed in response to at least one of conditions being satisfied, the conditions including an instruction being given from an operator, a predetermined change being detected in environmental conditions, and image formation on a predetermined number of sheet materials being completed.

3. A density control method for an image forming apparatus according to claim 1, comprising an interrupting and restarting step of interrupting an image forming operation being executed, when there occurs a need to carry out the maximum density control process and the density gradation control process during the image forming operation, and restarting the interrupted image forming operation after completion of the density gradation control process carried out at the plurality of image forming speeds of the image forming apparatus.

4. A density control method for an image forming apparatus according to claim 1, wherein the reference speed as the image forming speed is a highest one of the plurality of image forming speeds of the image forming apparatus.

5. An image forming apparatus capable of carrying out an image forming process at a plurality of image forming speeds, comprising:
    an image forming device;
    a detector that detects a density of an image for measurement formed by said image forming device;
    a first controller that carries out a maximum density control process in a manner such that said image forming device is controlled to form the image for measurement based on image data corresponding to a maximum density and such that the density of the formed image for measurement detected by said detector is equal to a predetermined value; and
    a second controller that carries out a density gradation control process to cause said image forming device to form the image for measurement having a plurality of graduations based on image data having a plurality of graduations, and determine a conversion table for image data conversion such that densities of respective gradations of the formed image for measurement detected as the density of the formed image for measurement by said detector exhibit predetermined characteristics;
    wherein said first controller carries out the maximum density control process at a reference image forming speed, and said second controller carries out the density gradation control process at each of the plurality of image forming speeds.

6. An image forming apparatus according to claim 5, wherein the maximum density control process is carried out in response to at least one of conditions being satisfied, the conditions including an instruction being given from an operator, a predetermined change being detected in environmental conditions, and image formation on a predetermined number of sheet materials being completed.

7. An image forming apparatus according to claim 5, comprising an interrupting and restarting controller that interrupts an image forming operation being executed, when there occurs a need to carry out the maximum density control process and the density gradation control process during the image forming operation, and restarts the interrupted image forming operation after completion of the density gradation control process carried out at the plurality of image forming speeds of the image forming apparatus.

8. An image forming apparatus according to claim 5, wherein the reference image forming speed is a highest one of the plurality of image forming speeds of the image forming apparatus.

* * * * *